No. 819,890. PATENTED MAY 8, 1906.
T. J. KEHOE.
FRICTION CLUTCH.
APPLICATION FILED NOV. 9, 1904.
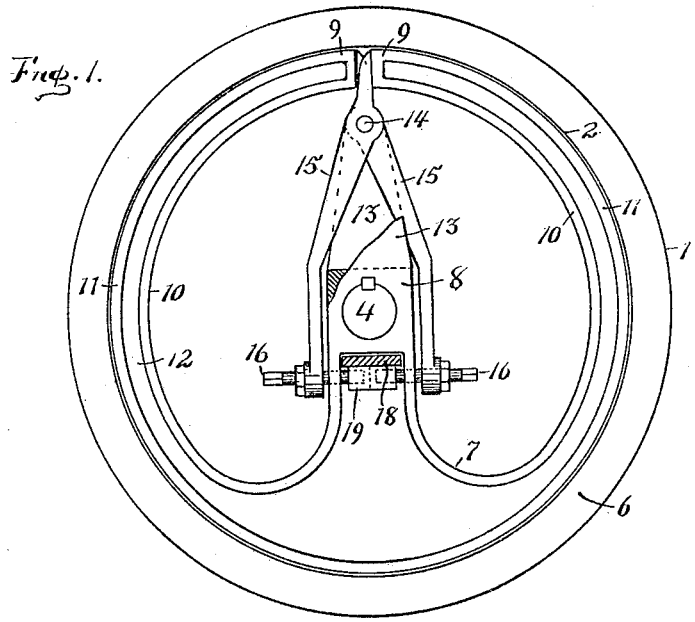
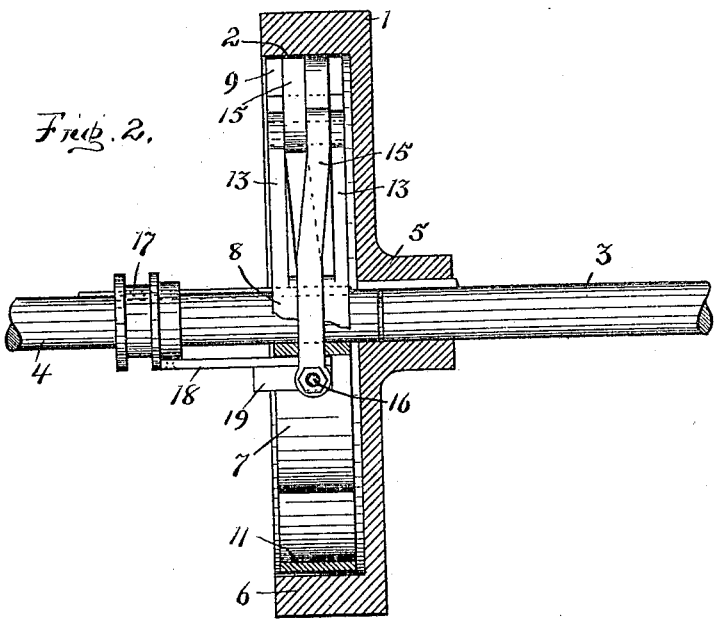
WITNESSES:
Thomas J. Kehoe INVENTOR
BY
ATTORNEY

UNITED STATES PATENT OFFICE.

THOMAS J. KEHOE, OF FORT WAYNE, INDIANA.

FRICTION-CLUTCH.

No. 819,890.　　　Specification of Letters Patent.　　　Patented May 8, 1906.

Application filed November 9, 1904. Serial No. 231,980.

*To all whom it may concern:*

Be it known that I, THOMAS J. KEHOE, a citizen of the United States of America, and a resident of Fort Wayne, in the county of Allen and State of Indiana, have invented certain new and useful Improvements in Friction-Clutches, of which the following is a specification.

This invention relates to improvements in friction-clutches; and the object thereof is to provide a clutch member which will effect a contact with the driving member evenly throughout its contact-surface. I accomplish this object by the construction illustrated in the accompanying drawings, in which—

Figure 1 is an end elevation showing the driving member and friction member in relative position; and Fig. 2 is a side elevation of the device, partly in section, in a plane at right angles to Fig. 1.

Similar numerals of reference indicate corresponding parts in both views, and, referring now to the same, 1 is a driving member consisting of an engine or other wheel having an internal friction-face 2 and which is mounted upon a suitable drive-shaft 3. A driven shaft 4 is mounted in alinement with the drive-shaft 3 and has a bearing-support in the hub 5 of the wheel 1. Fixed upon the driven shaft 4 and in a plane within the flange 6 of said wheel is a friction member 7, consisting of a spring-frame having a hub 8, which is attached rigidly to the driven shaft 4. The said frame has arms 9, which are relatively opposite and have inner and outer webs 10 and 11, respectively, the ends of the inner web being united with the corresponding ends of the outer web, and the space 12 between said webs is open. The ends of said arms approach one another, and the outer surface of the outer web 11 is adapted to engage with the friction-surface of the driving member when the said arms are spread, as hereinafter described. Supports 13 extend from the hub 8 and by means of a pin 14 carry oppositely-arranged levers 15, the upper ends of which extend between the approaching ends of the arms 9 and the lower ends of which carry adjustable studs 16, the latter extending loosely through the inner webs 10 of the spring-frame at opposite points beneath the hub 8. A sliding collar 17 is loosely keyed upon the driven shaft 4 and has longitudinal movement thereon, and an actuating-bar 18, carrying a wedge 19, is secured to said collar and is adapted to move therewith. The said wedge is located between the inner ends of the said studs and is adapted to press the same outward when suitably moved lengthwise, thereby causing the upper ends of the said levers to spread the approaching ends of said arms, with the resulting binding of said spring-frame against the frictional surface of the driving member. When the wedge is withdrawn, the spring-frame returns to its normal state, and thus the driving engagement between said frame and driving member ceases. As the spring-frame is actuated the driven shaft 4 is likewise rotated.

Having described my invention, what I claim as new, and desire to secure by Letters Patent, is—

1. In a friction-clutch, a driving member having an internal friction-face; a hub in axial alinement with the driving member; a spring-frame consisting of outer and inner curved webs, the ends of the latter being united with the corresponding ends of the former, and with its inner ends fixed to the hub, and the outer web being adapted to frictionally engage the driving member; and means in connection with the hub acting oppositely against the respective ends of the webs to expand the frame.

2. In a friction-clutch, a driving member having an internal friction-face; a spring-frame consisting of a hub and outer and inner curved webs, the latter web being secured to the hub and with its ends united with the corresponding ends of the former web, the outer web being adapted to frictionally engage the internal face of the driving member; and means in connection with the hub and acting oppositely against the respective united ends of the webs to expand the former.

3. In a friction-clutch, a driving member having an internal friction-face; a spring-frame consisting of a hub and outer and inner curved webs, the latter web being secured to the hub and with its ends united with the corresponding ends of the former web; two levers pivoted in connection with the hub, the outer ends thereof engaging respectively the united ends of said webs; and a movable wedge, in connection with the hub, adapted to engage and spread the respective inner ends of the levers, the said outer web being adapted to frictionally engage the internal face of the driving member when said levers are spread.

4. In a friction-clutch, a driving member having an internal friction-face; a spring-frame consisting of outer and inner curved webs, the latter supporting the former at its outer ends; a hub in fixed relation with the inner ends of the inner web; oppositely-disposed levers in pivotal connection with the hub and acting respectively against the corresponding ends of the webs; and means to actuate said levers.

In testimony whereof I affix my signature in presence of two witnesses.

THOMAS J. KEHOE.

Witnesses:
H. J. LAMPKE,
W. G. BURNS.